US010871219B2

(12) United States Patent
Akiyama et al.

(10) Patent No.: US 10,871,219 B2
(45) Date of Patent: Dec. 22, 2020

(54) SPEED-SWITCHABLE REDUCTION GEAR

(71) Applicant: Kobe Steel, Ltd., Hyogo (JP)

(72) Inventors: Hiroyuki Akiyama, Takasago (JP); Yasuo Yoshii, Takasago (JP); Yuji Konishi, Takasago (JP); Kazuo Yamaguchi, Takasago (JP); Kazuo Iritani, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 328 days.

(21) Appl. No.: 16/079,048

(22) PCT Filed: Feb. 10, 2017

(86) PCT No.: PCT/JP2017/004899
§ 371 (c)(1),
(2) Date: Aug. 22, 2018

(87) PCT Pub. No.: WO2017/145805
PCT Pub. Date: Aug. 31, 2017

(65) Prior Publication Data
US 2019/0048993 A1    Feb. 14, 2019

(30) Foreign Application Priority Data

Feb. 26, 2016 (JP) ................................ 2016-035688

(51) Int. Cl.
*F16H 57/00* (2012.01)
*F16H 57/04* (2010.01)
(Continued)

(52) U.S. Cl.
CPC ..... *F16H 57/0471* (2013.01); *F16C 33/1045* (2013.01); *F16H 3/089* (2013.01);
(Continued)

(58) Field of Classification Search
CPC ........ F16C 33/1045; F16H 3/089; F16H 3/22; F16H 57/0031; F16H 57/04;
(Continued)

(56) References Cited

U.S. PATENT DOCUMENTS 4,368,802 A * 1/1983 Grabill ................. F16H 57/043
184/6.12
4,823,631 A * 4/1989 Kishimoto ............. F16D 23/06
74/339

(Continued)

FOREIGN PATENT DOCUMENTS

JP    H10-110791 A    4/1998

*Primary Examiner* — Victor L MacArthur
(74) *Attorney, Agent, or Firm* — Studebaker & Brackett PC

(57) ABSTRACT

Provided is a speed-switchable reduction gear including: an input shaft; an output shaft; a plurality of output-side geared-wheels mounted on the output shaft; a shifter for selecting the output-side geared-wheel to be used; a shifter-side first bearing and a non-shifter-side second bearing provided to each the output-side geared-wheel; and a plurality of dividing walls each provided in each cell between the first and second bearings. The output shaft has an axial lubricating-oil flow path and a plurality of supply flow paths. Each dividing wall divides each cell into a first cell adjacent to the first bearing and a second cell adjacent to the second bearing and allows lubricating oil to be supplied from the supply flow paths into the first and second cells so as to make pressure of lubricating oil in the first cell higher than that in the second cell.

9 Claims, 6 Drawing Sheets

(51) Int. Cl.
  *F16H 3/22* (2006.01)
  *F16C 33/10* (2006.01)
  *F16H 3/089* (2006.01)
  *F16H 63/30* (2006.01)

(52) U.S. Cl.
  CPC ........... *F16H 3/22* (2013.01); *F16H 57/0031* (2013.01); *F16H 57/04* (2013.01); *F16H 57/043* (2013.01); *F16H 63/30* (2013.01); *F16H 2063/3096* (2013.01); *F16H 2200/0034* (2013.01)

(58) Field of Classification Search
  CPC ............... F16H 57/043; F16H 57/0469; F16H 57/0471; F16H 57/0478; F16H 63/30; F16H 2063/3096; F16H 2200/0034
  USPC .......... 384/462; 74/467; 192/113.34, 113.35; 184/6.12
  See application file for complete search history.

(56) References Cited

U.S. PATENT DOCUMENTS

| | | | |
|---|---|---|---|
| 6,929,402 B1 * | 8/2005 | Titus | F16C 17/10 384/107 |
| 9,822,869 B1 * | 11/2017 | Carr | F16H 57/0427 |
| 2011/0064344 A1 * | 3/2011 | Shibagaki | F16C 33/6674 384/462 |
| 2015/0045163 A1 * | 2/2015 | Botez | F16H 57/043 474/91 |

* cited by examiner $$\begin{cases} \cdot P_1 < P_2 \\ \cdot Q_1 \fallingdotseq Q_2 \end{cases}$$

SPEED-SWITCHABLE REDUCTION GEAR

TECHNICAL FIELD

The present invention relates to a reduction gear capable of transmitting a rotational driving force of an input shaft which is a drive rotating shaft to an output shaft which is a driven rotating shaft and capable of switching a speed of the output shaft, i.e., selecting a reduction ratio.

BACKGROUND ART

As a method of transmitting rotational power of a drive rotating shaft (input shaft) driven by a power unit such as a turbine, an engine, and a motor to a driven rotating shaft (output shaft), there is a two-stage switching reduction gear including a gear mechanism, for example, disclosed in FIG. 2 in Patent Literature 1. The two-speed-switchable reduction gear includes an input shaft, an output shaft, and a reduction gear housing for supporting them with respective bearings so as to make them parallel to each other. To the input shaft is input a torque from a drive unit via an input-side coupling. The output shaft transmits the torque to a driven unit such as a rolling mill via an output-side coupling.

The input shaft has a shaft part positioned in the reduction gear housing, the shaft part being provided with an input-side low-speed small geared-wheel and an input-side high-speed small geared-wheel having a larger pitch diameter than that of the input-side low-speed small geared-wheel, the small geared-wheels being disposed at a predetermined interval; the input shaft, the input-side low-speed small geared-wheel, and the input-side high-speed small geared-wheel are formed integrally. The output shaft has a shaft part positioned in the reduction gear housing, the shaft part being fitted with an output-side low-speed large geared-wheel which is meshed with the input-side low-speed small geared-wheel and an output-side high-speed large geared-wheel which has a smaller pitch diameter than that of the output-side low-speed large geared-wheel and which is meshed with the input-side high-speed small geared-wheel via respective bearings interposed therebetween, the output-side low-speed large geared-wheel and the output-side high-speed large geared-wheel being on the outside of the shaft part. The output-side low-speed large geared-wheel has a pair of side wall faces and an output-side low-speed small geared-wheel protrudes beyond one of the side wall faces, the one being closer to the output-side high-speed large geared-wheel than the other and transmission/interruption of transmission of the torque to the output-side high-speed small geared-wheel is carried out. The output-side high-speed large geared-wheel has paired side wall faces and an output-side high-speed small geared-wheel protrudes from one of the side wall faces closer to the output-side low-speed large geared-wheel and transmission/interruption of transmission of the torque to the output-side high-speed small geared-wheel is carried out. The output-side high-speed small geared-wheel and the output-side low-speed small geared-wheel have respective pitch diameters equal to each other.

The speed-switchable reduction gear further includes a rotating speed switching device. The rotating speed switching device is provided between the output-side low-speed small geared-wheel and the output-side high-speed small geared-wheel. The rotating speed switching device includes a torque transmission gear, a switching ring, and a U-shaped member. The torque transmission gear has a pitch diameter equal to that of each of the output-side small geared-wheels and is provided to the output shaft. The switching ring has an inner peripheral surface provided with internal teeth to be meshed with teeth of the torque transmission gear, and an outer peripheral portion provided with a groove, the switching ring being fitted with the torque transmission gear at the outside of torque transmission gear. The U-shaped member has a pair of sliders opposed to each other and fitted slidably in the groove. The U-shaped member is operated by an operating lever to reciprocate the switching ring axially of the output shaft.

The output shaft is connected with an output shaft rotation adjusting device. The output shaft rotation adjusting device is a device for slightly rotating the output shaft in order to align a female spline portion of the switching ring with the respective output-side small geared-wheels upon switching the speed. After the finish of the positioning, the interconnection of the output shaft rotation adjusting device and the output shaft is released. Specifically, rotation of the input shaft is not transmitted to the output shaft when the switching ring is at a central position, whereas the slide of the switching ring leftward, for example, by the operation of the operating lever, brings the internal teeth of the switching ring into mesh with the teeth of the torque transmission gear and mesh with the teeth of the output-side high-speed small geared-wheel. The rotation of the input shaft is thereby transmitted to the output shaft via the input-side high-speed small geared-wheel, the output-side high-speed large geared-wheel, the output-side high-speed small geared-wheel, the switching ring, and the torque transmission gear. At this time, the output-side low-speed large geared-wheel is idling. On the other hand, the slide of the switching ring rightward, for example, by the operation of the operating lever, brings the internal teeth of the switching ring into mesh with the teeth of the torque transmission gear and mesh with teeth of the output-side low-speed small geared-wheel. The rotation of the input shaft is thereby transmitted to the output shaft via the input-side low-speed small geared-wheel, the output-side low-speed large geared-wheel, the output-side low-speed small geared-wheel, the switching ring, and the torque transmission gear. At this time, the output-side high-speed large geared-wheel is idling.

The rotating speed of the output shaft is, thus, switched bidirectionally between low-speed rotation (first gear) and high-speed rotation (second gear) by the operation of the switching ring in leftward and rightward directions through the operating lever.

The reduction gear has a problem of difficulty in appropriate supply of lubricating oil to each of the gears and bearings. In order to explain this problem, assumed is a reduction gear having the output shaft provided with a hole along the axis of the output shaft for supplying lubricating oil, through which hole lubricating oil is supplied from a shaft end of the output shaft to each of the bearings, the output-side small geared-wheels, and the rotation transmitting gear. The problem with the reduction gear will be discussed below.

In the thus assumed reduction gear, for example, the slide of the switching ring as a shifter toward the output-side high-speed small geared-wheel by the operation of the operating lever brings the internal teeth of the switching ring into respective meshes with both of the external teeth which are the teeth provided to an outer peripheral surface of the torque transmission gear and the external teeth which are the teeth provided to an outer peripheral surface of the small geared-wheel of the high-speed large geared-wheel. The meshes allow the rotational driving force of the input shaft to be transmitted to the output shaft via the input-side high-speed small geared-wheel, the output-side high-speed large geared-wheel, the output-side high-speed small geared-wheel, the switching ring, and the torque transmission gear.

During the transmission, the amount of lubricating oil supplied to parts related to the output-side high-speed large geared-wheel, specifically, the amount of lubricating oil supplied to the bearings fitted with the output-side high-speed large geared-wheel at the inside thereof, the output-side high-speed small geared-wheel, the inner sides of the external teeth of the torque transmission gear, and the inner sides of the internal teeth of the switching ring which is the shifter, becomes smaller than that of lubricating oil supplied to the bearings fitted in the idling output-side low-speed large geared-wheel; this generates the possibility of lubrication failure in the parts related to the output-side high-speed large geared-wheel. Moreover, the transmission of the torque through the output-side high-speed large geared-wheel may involve, out of the parts, reduction in the amount of lubricating oil supplied to the bearing for the switching ring which is the shifter in comparison with that of lubricating oil supplied to the bearing on the opposite side (non-sifter side). More specifically, in the output-side high-speed large geared-wheel for transmitting the rotational driving force, the lubricating oil flowing to the opposite side from the switching ring only has to pass through the bearing inside the output-side high-speed large geared-wheel on the opposite side, whereas the lubricating oil flowing toward the switching ring which is the shifter has to pass through not only the bearing inside the output-side high-speed large geared-wheel but also the internal teeth of the switching ring, the external teeth of the torque transmission gear, and the external teeth of the output-side high-speed small geared-wheel, which are meshed with one another. This makes the amount of lubricating oil supplied to one of both the bearings, the one being closer to the switching ring, be smaller than that of lubricating oil supplied to the bearing opposite to the one; this may cause the lubrication failure, such as seizing up of the bearing close to the switching ring as the shifter, due to the shortage in supply amount of lubricating oil.

For the above-described reason, the prior-art speed-switchable reduction gear has problems of difficulty in supplying the appropriate amount of lubricating oil to the gears on the transmitting side and difficulty in supplying the appropriate quantity of lubricating oil to the bearing close to the switching ring on the transmitting side.

CITATION LIST

Patent Literature
Patent Literature 1: Japanese Patent Application Laid-open No. 10-110791

SUMMARY OF INVENTION

It is an object of the present invention to provide a speed-switchable reduction gear allowing lubricating oil to be appropriately supplied to bearings supporting output-side geared-wheels. Provided is a speed-switchable reduction gear capable of switching a reduction ratio, including: an input shaft; an output shaft which outputs a rotational driving force transmitted from the input shaft, to an outside; a plurality of output-side geared-wheels which are mounted on the output shaft correspondingly to respective reduction ratios so as to be capable of transmitting the rotational driving force from the input shaft to the output shaft and switching the reduction ratio that is a ratio of a rotating speed of the input shaft to a rotating speed of the output shaft; a shifter which selectively connects one of the plurality of output-side geared-wheels to the output shaft to allow the rotational driving force to be transmitted from the output shaft gear to the output shaft; a first bearing and a second bearing which are provided to each of the plurality of output-side geared-wheels, the first bearing and the second bearing being disposed on an outer peripheral surface of the output shaft and spaced axially of the output shaft so as to form, between the first bearing and the second bearing, a cell for supplying lubricating oil to the first bearing and the second bearing, the first bearing and the second bearing supporting each of the output-side geared-wheels so as to allow the output-side geared-wheel to be rotated relatively to the output shaft; and a plurality of dividing walls each provided in each of the cells on an inner side of each of the plurality of output-side geared-wheels so as to protrude radially outward from the outer peripheral surface of the output shaft. Each of the first bearings is a shifter-side bearing provided at a position where the first bearing allows the lubricating oil to be supplied to the shifter through the first bearing, the position being closer to the shifter than the dividing wall, and each of the second bearings is a non-shifter-side bearing positioned on opposite side of the dividing walls to the first bearing. The output shaft includes an axial lubricating-oil flow path, which extends along axially of the output shaft in the output shaft to allow the lubricating oil to flow in the axial lubricating-oil flow path, and a plurality of supply flow paths which extend radially outward from the axial lubricating-oil flow path to make communication with the cells. Each of the dividing walls divides each of the cells into a first cell adjacent to each of the first bearings and a second cell adjacent to each of the second bearings and allows the lubricating oil to be supplied from the supply flow paths into each of the first cells and to be supplied from the supply flow paths into each of the second cells so as to make pressure of the lubricating oil in each of the first cells be higher than pressure of the lubricating oil in each of the second cells.

DESCRIPTION OF EMBODIMENTS

There will be described below an embodiment of the present invention based on the drawings. In the embodiment, illustrated is a two-speed-switchable reduction gear 1 including an input shaft 2 and an output shaft 5, as a speed-switchable reduction gear according to the present invention.

Figure 1:
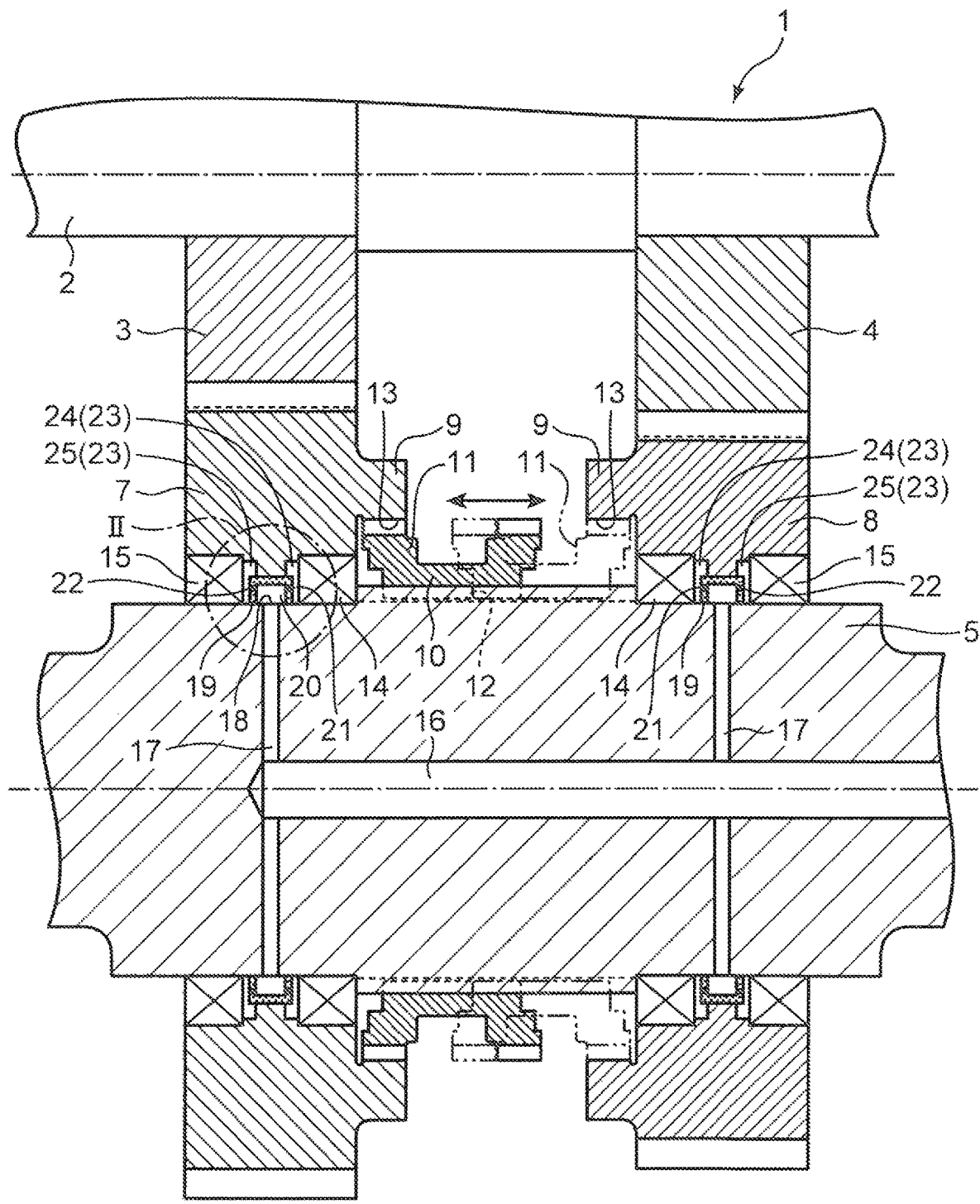
FIG. 1 is a sectional front view showing a speed-switchable reduction gear according to an embodiment of the present invention.

An upper side of a plane of a paper sheet of FIG. 1 corresponds to an input shaft side of the two-speed-switchable reduction gear 1 and a lower side of the paper sheet of FIG. 1 corresponds to an output shaft side of the two-speed-switchable reduction gear 1. An up-down direction of the plane of the paper sheet of FIG. 1 corresponds to a width direction of the two-speed-switchable reduction gear 1. In FIG. 1, a rotational driving force is input to the two-speed-switchable reduction gear 1 from a right side of the plane of the paper sheet and the rotational driving force is output to a left side of the plane of the paper sheet from the two-speed-switchable reduction gear 1. Specifically, the rotational driving force is input to the input shaft 2 from a drive source provided on an upstream side on the right side of the plane of the paper sheet of FIG. 1, and speed reduction is performed at a predetermined reduction ratio in the two-speed-switchable reduction gear 1; thereafter, the rotational driving force is output through the output shaft 5 to an object to be driven which is provided on a downstream side on the left side of the plane of the paper sheet of FIG. 1. The two-speed-switchable reduction gear 1 is a device applicable to various power units.

As shown in FIG. 1, the two-speed-switchable reduction gear 1 further includes an input-side low-speed gear 3 and an input-side high-speed gear 4, which are fixed to the input shaft 2, an output-side low-speed large geared-wheel 7 and an output-side high-speed large geared-wheel 8, which are mounted on the output shaft 5, and a shifter 10. The two-speed-switchable reduction gear 1 is a constant-mesh reduction gear, in which the input-side low-speed gear 3 and the output-side low-speed large geared-wheel 7 are constantly meshed with each other and the input-side high-speed gear 4 and the output-side high-speed large geared-wheel 8 are constantly meshed with each other. The shifter 10 is provided between the output-side low-speed large geared-wheel 7 and the output-side high-speed large geared-wheel 8 and selectively connects one of the output-side low-speed large geared-wheel 7 and the output-side high-speed large geared-wheel 8 to the output shaft 5 to allow the rotational driving force to be transmitted from the output-side large geared-wheel 7 or 8 to the output shaft 5 to thereby allow the reduction ratio, which is a ratio of the rotating speed of the input shaft 2 to the rotating speed of the output shaft 5, to be switched between a low reduction ratio which is a first reduction ratio and a high reduction ratio which is a second reduction ratio.

The input shaft 2 and the output shaft 5 penetrate through a not-graphically-shown casing and the geared-wheels provided to the respective shafts 2 and 5 are housed in the casing. The rotational driving force input from the mechanical power source to the input shaft 2 is transmitted to the output shaft 5, with a speed reduction to a predetermined speed, via one of the two output-side large geared-wheels in the casing, namely, the low-speed large geared-wheel 7 and the high-speed large geared-wheel 8, selected by the shifter 10, and the rotational driving force is output to the outside through the output shaft 5.

The input shaft 2 is a long bar made of steel or the like, having an outer diameter able to deal with the rotational driving force (torque) input from the mechanical power source to introduce the rotational driving force into the casing. The input-side low-speed gear 3 and the input-side high-speed gear 4 are fitted onto an outer peripheral surface of the input shaft 2 at a predetermined axial interval, wherein the input-side high-speed gear 4 is located on the right side of the input-side low-speed gear 3. Each of the input-side gears 3 and 4 is fixed to the input shaft 2 so as be rotated together with the input shaft 2.

The output shaft 5 is a long bar similar to the input shaft 2 in a shape and material which the output shaft 5 is made of, and outputs the transmitted rotational driving force to the outside. The output shaft 5 is disposed at a predetermined interval between the output shaft 5 and the input shaft 2 so as to make the axis of the output shaft 5 parallel to that of the input shaft 2. The output-side low-speed large geared-wheel 7 and the output-side high-speed large geared-wheel 8 are disposed on the outer peripheral surface of the output shaft 5 at a predetermined axial interval. The output-side low-speed large geared-wheel 7 is disposed at a position opposed to the input-side low-speed gear 3 so as to be meshed with teeth formed in an outer peripheral surface of the input-side low-speed gear 3. Similarly, the output-side high-speed large geared-wheel 8 is disposed at a position opposed to the input-side high-speed gear 4 so as to be meshed with teeth formed in an outer peripheral surface of the input-side high-speed gear 4.

The output-side low-speed large geared-wheel 7 and the output-side high-speed large geared-wheel 8 are therefore disposed at the same interval as the interval between the input-side low-speed gear 3 and the input-side high-speed gear 4. Specifically, the output-side low-speed large geared-wheel 7 and the output-side high-speed large geared-wheel 8 are rotatably mounted on the outer peripheral surface of the output shaft 5 through a pair of first bearing 14 and second bearing 15, respectively. The pair of first and second bearings 14 and 15 are spaced at an interval along a direction of the axis of the output shaft 5 indicated by a one-dot chain line in FIG. 1 and form a cell 23, which is a predetermined space between the bearings 14 and 15.

The output-side low-speed large geared-wheel 7 is a disc-shaped member, having an outer peripheral surface where the predetermined number of teeth are formed and an inner hole formed at a central portion to allow the output shaft 5 to pass through the inner hole. The output-side low-speed large geared-wheel 7 has the same face width as the input-side low-speed gear 3. Each of the first and second bearings 14 and 15 provided inside the output-side low-speed large geared-wheel 7 has an outer race fitted in the inner hole of the output-side low-speed large geared-wheel 7 and an inner race fitted onto the outer peripheral surface of the output shaft 5. The output-side low-speed large geared-wheel 7 is thus mounted on the output shaft 5 through the paired first and second bearings 14 and 15 so as to be rotatable relatively to the output shaft 5. In other words, the first and second bearings 14 and 15 support the output-side low-speed large geared-wheel 7 so as to allow the output-side low-speed large geared-wheel 7 to be rotated relatively to the output shaft 5.

The output-side low-speed large geared-wheel 7 has a protruding portion 9. The protruding portion 9 protrudes axially beyond a side wall face which faces the high-speed large geared-wheel 8, out of both side faces of the output-side low-speed large geared-wheel 7, having an annular shape enclosing the axis. The protruding portion 9 has a peripheral surface facing the output shaft 5, namely, an inner peripheral surface, which is formed with splines 13 as internal teeth.

The output-side high-speed large geared-wheel 8 is a disc-shaped member similarly to the output-side low-speed large geared-wheel 7, while having a smaller outer diameter than that of the output-side low-speed large geared-wheel 7. The output-side high-speed large geared-wheel 8 has an inner hole formed at a center and an outer peripheral surface where the predetermined number of teeth are formed whereas the number of teeth is different from that of the output-side low-speed large geared-wheel 7. The output-side high-speed large geared-wheel 8 has the same face width as the input-side high-speed gear 4. Each of the first and second bearings 14 and 15 provided inside the output-side high-speed large geared-wheel 8 has an outer race fitted in the inner hole of the output-side high-speed large geared-wheel 8 and an inner race fitted onto the outer peripheral surface of the output shaft 5. The output-side high-speed large geared-wheel 8 is thus mounted on the output shaft 5 through the first and second bearings 14 and 15 so as to allow the output-side high-speed large geared-wheel 8 to be rotated relatively to the output shaft 5. In other words, the first and second bearings 14 and 15 support the output-side high-speed large geared-wheel 8 so as to allow the output-side high-speed large geared-wheel 8 to be rotated relatively to the output shaft 5.

Also the output-side high-speed large geared-wheel 8 has a protruding portion 9. The protruding portion 9 protrudes axially beyond a side wall face which faces the output-side low-speed large geared-wheel 7, out of both side faces of the output-side high-speed large geared-wheel 8, having an annular shape enclosing the axis. The protruding portion 9 has a peripheral surface facing the output shaft 5, namely, an inner peripheral surface, which is formed with splines 13 as internal teeth, the splines 13 having the same pitch diameter as the splines 13 formed in the output-side low-speed large geared-wheel 7. The splines 13 formed in both of the high-speed large geared-wheel 8 and the low-speed large geared-wheel 7 are large-diameter splines.

The output shaft 5 has a portion located between the low-speed large geared-wheel 7 and the high-speed large geared-wheel 8, the portion having an outer peripheral surface formed with a plurality of small-diameter splines 12 arranged circumferentially over the entire circumference of output shaft 5. The shifter 10 is disposed so as to enclose the small-diameter splines 12 at a position on the radially outer side of the small-diameter splines 12. The shifter 10 is movable between the low-speed large geared-wheel 7 and the high-speed large geared-wheel 8 along the output shaft 5 as indicated by solid lines and two-dot chain lines in FIG. 1 and the movement allows the rotational driving force transmission route from the input shaft 2 to the output shaft 5 to be selected from a first route and a second route; the first route includes the low-speed large geared-wheel 7 to perform speed reduction at the first reduction ratio while the second route includes the high-speed large geared-wheel 8 to perform speed reduction at the second reduction ratio.

The shifter 10 has a substantially U-shaped section having an axially central part opened radially outward in a side view, having a ring shape enclosing the outer peripheral surface of the output shaft 5. The shifter 10 has an inner peripheral surface and an outer peripheral surface. The inner peripheral surface is formed with internal splines having a pitch diameter equal to the pitch diameter of the small-diameter splines 12 formed in the outer peripheral surface of the output shaft 5, the internal splines being meshed with the small-diameter splines 12. The shifter 10, therefore, has an inner diameter substantially equal to the outer diameter of the output shaft 5.

The outer peripheral surface of the shifter 10 has a pair of protruding portions 11 located at axially opposite end portions of the shifter 10, respectively. The paired protruding portions 11 protrude radially outward beyond the axially intermediate part so as to correspond to the protruding portion 9 of the low-speed large geared-wheel 7 and the protruding portion 9 of the high-speed large geared-wheel 8, respectively. Each of the protruding portions 11 is formed with external splines having a pitch diameter equal to the pitch diameter of respective large-diameter splines 13 formed in the respective large geared-wheels 7 and 8. One of the groups of external splines is selectively meshed with the corresponding one of the output-side large geared-wheels 7 and 8, thus the selection of the rotational driving force transmission route between the first reduction ratio and the second reduction ratio being performed. The shifter 10, therefore, has an outer diameter substantially equal to the inner diameters of the protruding portions 9.

When the shifter 10 is connected to the low-speed large geared-wheel 7 as indicated by the solid lines in FIG. 1, the rotational driving force of the input shaft 2 is transmitted to the output shaft 5 via the low-speed gear 3, the low-speed large geared-wheel 7, the large-diameter splines 13, the shifter 10, and the small-diameter splines 12, while involving speed reduction at the first reduction ratio. At this time, the high-speed large geared-wheel 8 is left out of the power transmission and idles while supported by the paired first and second bearings 14 and 15.

When the shifter 10 is connected to the high-speed large geared-wheel 8 as indicated by the two-dot chain lines in FIG. 1, the rotational driving force of the input shaft 2 is transmitted to the output shaft 5 via the high-speed gear 4, the high-speed large geared-wheel 8, the large-diameter splines 13, the shifter 10, and the small-diameter splines 12, while involving speed reduction at the second reduction ratio. At this time, the low-speed large geared-wheel 7 is left out of the power transmission and idles while supported by the paired first and second bearings 14 and 15.

During the above-described operation of two-speed-switchable reduction gear 1, the small-diameter splines 12, the large-diameter splines 13, and the first and second bearings 14 and 15 require lubrication. In order to enable the lubrication, there are internally formed a central lubricating oil flow path 16 and a plurality of radial flow paths 17 in the output shaft 5.

The central lubricating oil flow path 16 is an axial lubricating-oil flow path which is formed in a radially central part of the output shaft 5 to allow the lubricating oil to be flowed along the axial direction of the output shaft 5. The central lubricating oil flow path 16 has a cylindrical shape with axially opposite end portions, one of which end portions forming an inlet 6 opened at the one end portion of the output shaft 5, while the other of which end portions being closed inside the output shaft 5. The inlet 6 allows lubricating oil to be sent from outside into the central lubricating oil flow path 16 through the inlet 6.

The plurality of radial flow paths 17 are supply flow paths formed at respective positions corresponding to the low-speed large geared-wheel 7 and the high-speed large geared-wheel 8 mounted on the output shaft 5, branching off outward in the radial direction from the central lubricating oil flow path 16 and extend in the radial direction to be communicated with the cells 23 for supplying the lubricating oil to the bearings 14 and 15 respectively. Each of the radial flow paths 17 has a smaller inner diameter than that of the central lubricating oil flow path 16. The plurality of radial flow paths 17 according to the embodiment extend straight from the center of the output shaft 5 toward respective inner peripheral surfaces of the low-speed large geared-wheel 7 and the high-speed large geared-wheel 8 which are mounted on the output shaft 5. In the example shown in FIG. 1, each of the low-speed large geared-wheel 7 and the high-speed large geared-wheel 8 are provided with two of the radial flow paths 17, which are disposed so as to locate their respective axes on the same straight line.

Each of the radial flow paths 17 has a radially outer end portion, which is an outlet 18 opened toward the widthwise central part of the inner peripheral surface of the low-speed large geared-wheel 7 or the high-speed large geared-wheel 8. Each of the radial flow paths 17 is, thus, formed so as to allow lubricating oil to be supplied through the outlet 18 into the cell 23 formed between the paired bearings 14 and 15 fitted onto the output shaft 5 at outside thereof. The radial flow paths 17 enable lubricating oil to be supplied into each of the cells 23 so as to branch off radially outward from the outer peripheral surface of the output shaft 5. The direction and the number of the radial flow paths 17 are free to be selected under the condition of allowing sufficient lubricating oil to be supplied to the cells 23.

The two-speed-switchable reduction gear further includes a plurality of dividing walls 19. The plurality of dividing walls 19 are provided in the respective cells 23 formed between the first and second bearings 14 and 15, which are provided to the output-side large geared-wheels 7 and 8, respectively, being located outside respective outlets 18 of the radial flow paths 17. Each of the first bearings 14 is a shifter-side bearing provided at a position where the first bearing 14 allows lubricating oil to be supplied to the shifter 10 through the first bearing, the position being closer to the shifter 10 than the dividing walls 19; each of the second bearings 15 is a non-shifter side bearing located on the opposite side of the dividing wall 19 to the first bearings 14.

Below will be focused and described the dividing wall 19 provided to the low-speed large geared-wheel 7, out of the plurality of dividing walls 19. The dividing wall 19 for the high-speed large geared-wheel 8 has a similar structure to that of the dividing wall 19 for the low-speed large geared-wheel 7, specifically, a structure which is a reflection of the dividing wall 19 for the low-speed large geared-wheel 7; hence, the specific description about the dividing wall 19 for the high-speed large geared-wheel 8 will be omitted.

Figure 2:
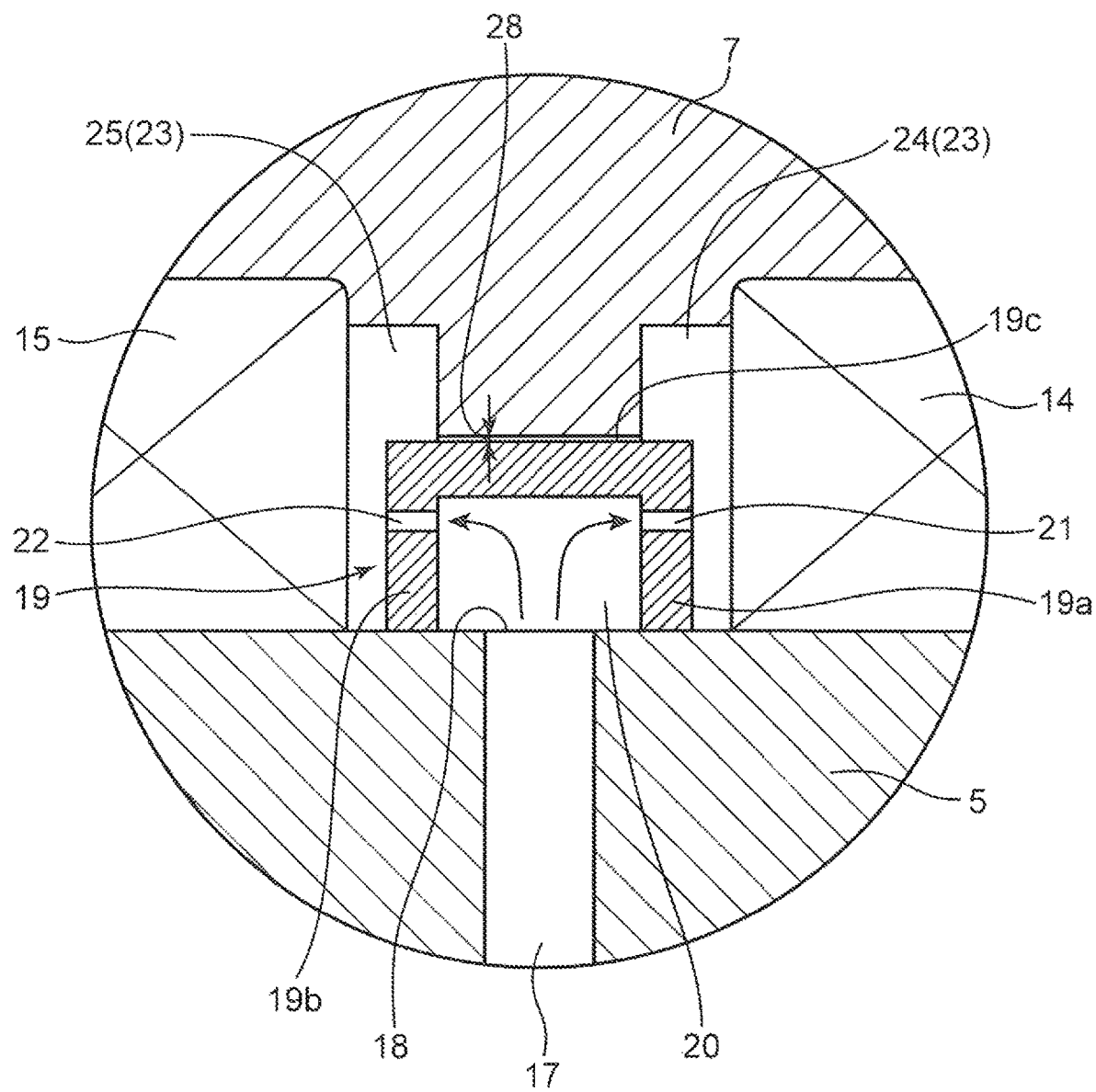
FIG. 2 is an enlarged view of a part enclosed with circle II in FIG. 1.
Figure 3:
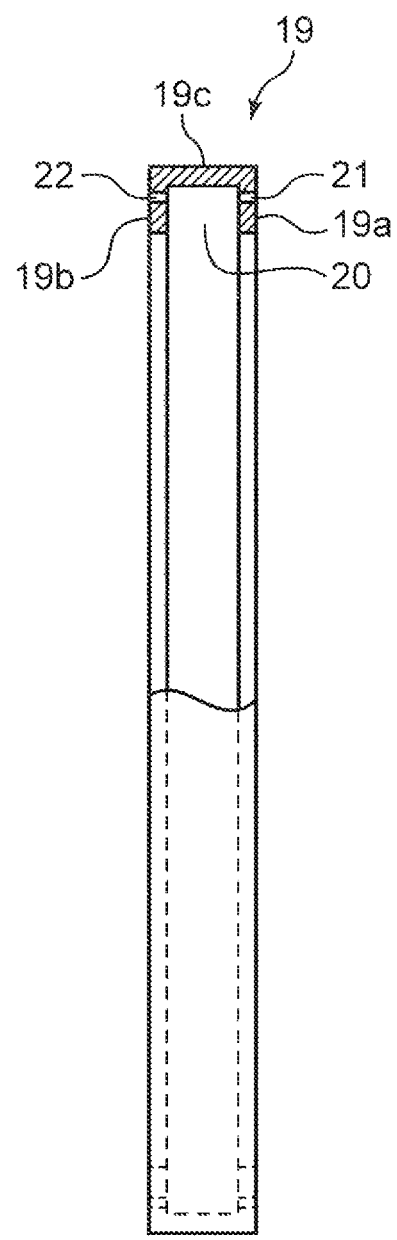
FIG. 3 is a partially sectional front view of a dividing wall constituting the speed-switchable reduction gear.
Figure 4:
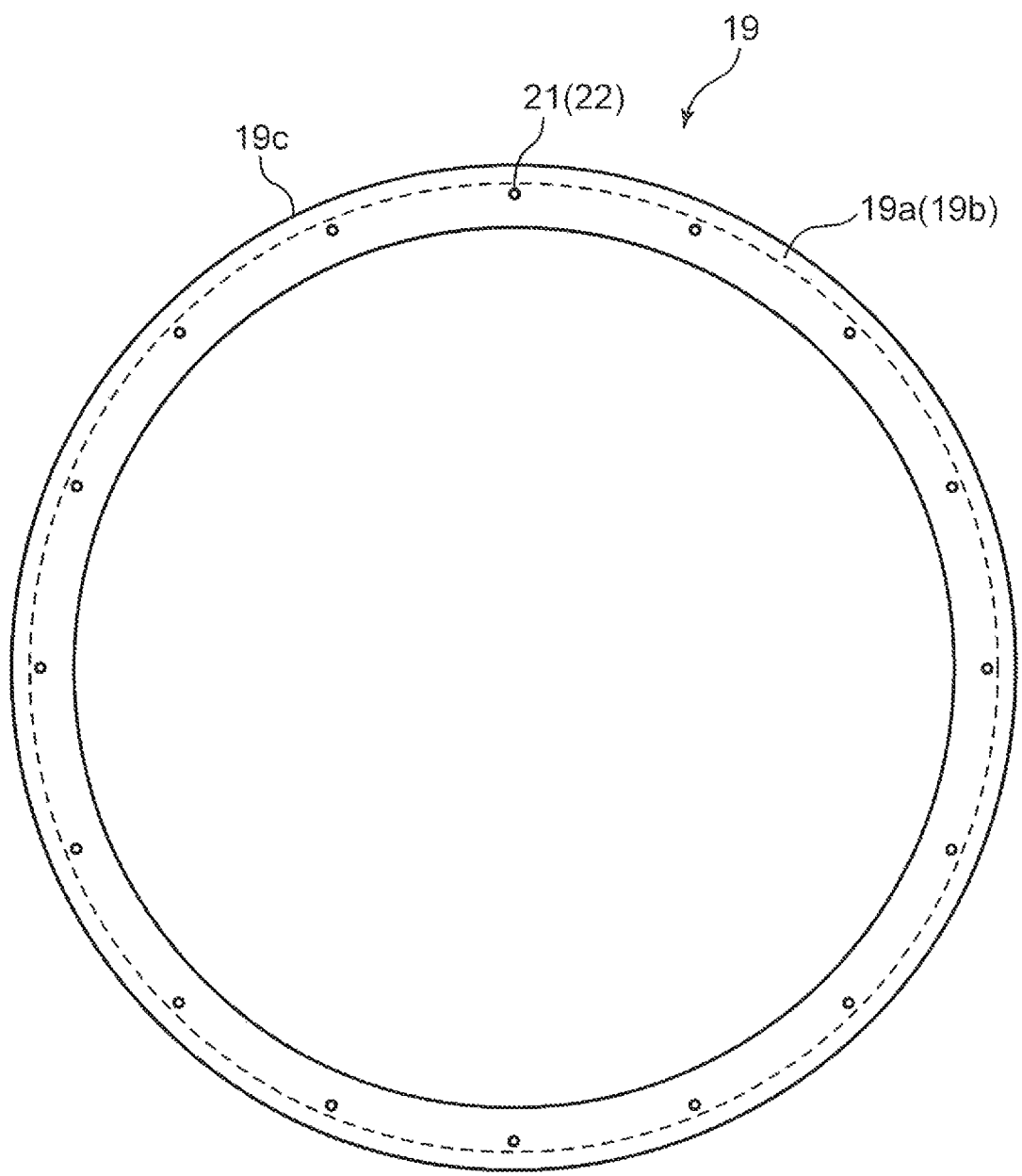
FIG. 4 is a side view of the dividing wall.

As shown in FIGS. 1 to 3, the dividing wall 19 according to the present embodiment is provided on the outer peripheral surface of the output shaft 5 so as to protrude radially outward from the outer peripheral surface. The dividing wall 19 divides the cell 23 into a first cell 24 which is a shifter-side cell adjacent to the first bearing 14 and a second cell 25 which is a non-shifter-side cell adjacent to the second bearing 15, thereby increase mutual independence of pressure of lubricating oil supplied into the first cell 24 and pressure of lubricating oil supplied into the second cell 25.

The dividing wall 19 is a ring-shaped member having a section including a widthwise central portion opened radially inward toward the outer peripheral surface of the output shaft 5. Precisely, the dividing wall 19 includes: a first side wall 19a standing radially on the outer peripheral surface of the output shaft 5 at a position between the outlet 18 and the first bearing 14; a second side wall 19a standing radially on the outer peripheral surface of the output shaft 5 at a position between the outlet 18 and the second bearing 15; and a peripheral wall 19c extending circumferentially over the entire circumference thereof so as to interconnect the outer peripheral portion of the first side wall 19a and the outer peripheral portion of the second side wall 19b. The first side wall 19a defines the first cell 24 between the first side wall 19a and the first bearing 14 and the second side wall 19b defines the second cell 28 between the second side wall 19b and the second bearing 15.

The ring-shaped dividing wall 19 is disposed with a radial clearance between the dividing wall 19 and one of the output-side large geared-wheel 7 and 8 supported on the output shaft 5 so as to be rotatable relatively to the one of the output-side large geared-wheel 7 and 8. The ring-shaped dividing wall 19 is disposed on an inner side of the output-side large geared-wheel 7 or 8 and on an outer side of the output shaft 5, thus dividing the cell 23 formed between the paired bearings 14 and 15 into the second cell 25, which is the non-shifter-side cell for allowing the lubricating oil to be supplied to the second bearing 15 located on the opposite side of the dividing wall 19 to the shifter 10, and the first cell 24, which is the shifter-side cell for allowing the lubricating oil to be supplied to the first bearing 14 closer to the shifter 10 than the dividing wall 19.

The dividing wall 19 defines an outer peripheral flow path 20 inside the dividing wall 19. The outer peripheral flow path 20 has a shape causing lubricating oil flowing out radially outward through the outlets 18 of the radial flow paths 17 to flow along the circumferential direction of the output shaft 5, i.e., an annular shape along the outer peripheral surface of the output shaft 5. On the outer side of the dividing wall 19, for example, in the clearance between the outer peripheral surface of the peripheral wall 19c of the dividing wall 19 and the inner peripheral surface of the output-side large geared-wheel 7 or 8, there is provided a seal structure which suppresses the flow of lubricating oil between the second cell 25 as the non-shifter-side cell and the first cell 24 as the shifter-side cell so as to maintain a pressure difference between the pressure in the second cell 25 and the pressure in the first cell 24. The seal structure is formed, for example, of a clearance seal, an oil seal, or a mechanical seal.

The first side wall 19a and the second side wall 19b of the dividing wall 19 are provided with a plurality of first lubrication holes 21 and a plurality of second lubrication holes 22, respectively, and the second cell 25 as the non-shifter-side cell and the first cell 24 as the shifter-side cell are supplied with lubricating oil through the first and second lubrication holes 21 and 22, respectively. Respective shapes of the first and second lubrication holes 21 and 22 are set so that, when the pressure in the first cell 24 is higher than that in the second cell 25 and respective lubricating oils pass through the first lubrication holes 21 and the second lubrication holes 22 at the same temperature and at the same flow rate, the difference between the pressure of lubricating oil not having passed through the second lubrication holes 22 and the pressure of lubricating oil having passed through the second lubrication holes 22 is larger than the difference between the pressure of lubricating oil not having passed through the first lubrication holes 21 and the pressure of lubricating oil having passed through the first lubrication holes 21. Precisely, the first and second lubrication holes 21 and 22 have respective shapes causing a state where the pressure in the first cell 24 as the shifter-side cell is higher than the pressure in the second cell 25 as the non-shifter-side cell to thereby allow lubricating oil to be supplied through the first cell 24 at a flow rate enough to lubricate the first bearing 14. The first and second lubrication holes 21 and 22 have respective inner diameters smaller than that of the central lubricating oil flow path 16.

As shown in FIG. 3, the plurality of first lubrication holes 21 and the plurality of second lubrication holes 22 are formed at respective positions aligned at constant intervals along the outer peripheral direction of the output shaft 5 in the first side wall 19a and the second side wall 19b, respectively. Preferably, each of the first lubrication holes 21 and each of the second lubrication holes 22 are opposed to each other. It is effective, in increasing the mutual independence of the pressures of respective lubricating oils supplied to the paired bearings 14 and 15, to make respective pressure losses in the first and second lubrication holes 21 and 22 as respective lubricating oil supply flow paths for the paired bearings 14 and 15 be different from each other; more specifically, it is effective to set respective shapes of the lubrication holes 21 and 22 so as to make the flow resistance to the hydraulic oil through the second lubrication holes 22 be larger than the flow resistance to the lubricating oil through the first lubrication holes 21. The difference between the pressure losses can be generated, for example, by making the lubrication holes 21 and 22 be different from each other in their lengths, their shapes, the number of them or the like.

Next will be described the flow of lubricating oil supplied to each of the first and second bearings 14 and 15. Regarding the low-speed large geared-wheel 7, lubricating oil is sent into the central lubricating oil flow path 16 through the inlet 6 at the end portion of the output shaft 5 and supplied, via the radial flow paths 17 on the low-speed side and the dividing wall 19 on the low-speed side, to the paired left and right bearings 14 and 15, the small-diameter splines 12 of the output shaft 5, the internal splines of the shifter 10 meshed with the small-diameter splines 12, the large-diameter splines 13 of the low-speed large geared-wheel 7, and the external splines of the shifter 10 meshed with the large-diameter splines, respectively, to lubricate them.

Figure 5:
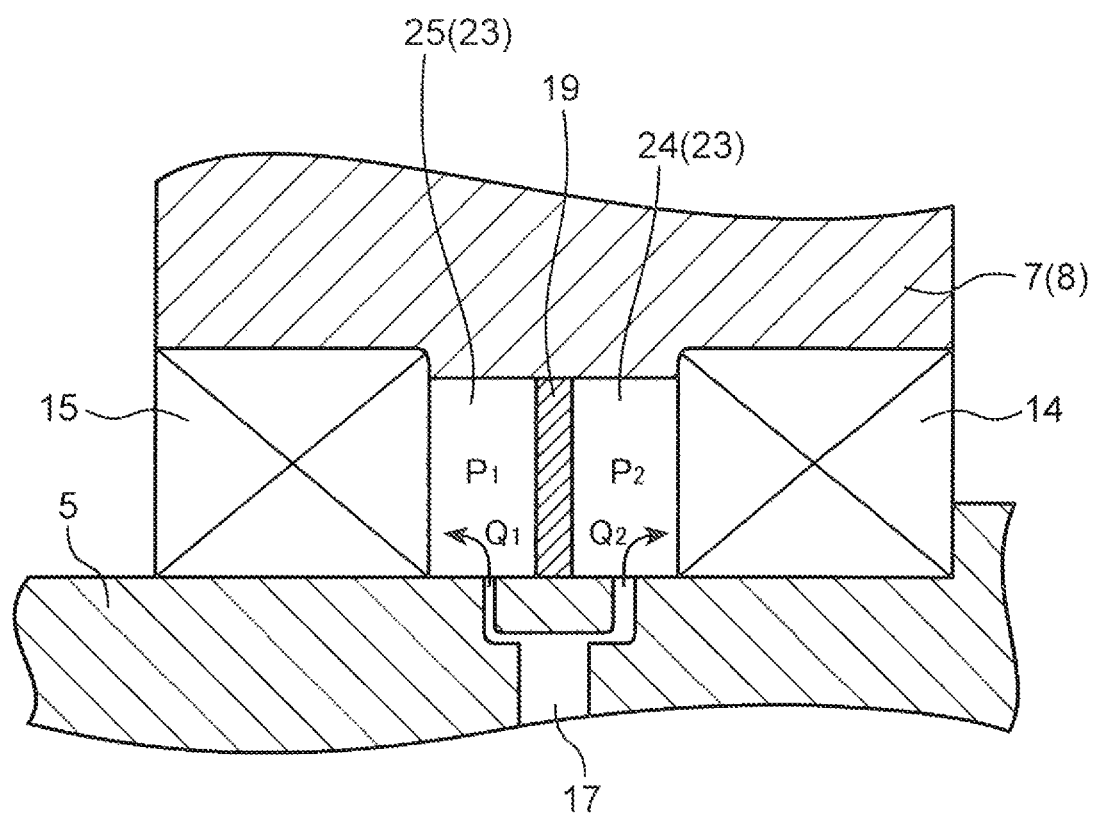
FIG. 5 is a schematic view of flows of lubricating oil in a vicinity of the dividing wall.

The lubricating oil supplied into the second cell 25 as the non-shifter-side cell only has to pass through the second bearing 15 whereas the lubricating oil supplied into the first cell 24 as the shifter-side cell has to pass through not only the first bearing 14 but also the small-diameter splines 12, the internal splines meshed with the small-diameter splines 12, the large-diameter splines 13, and the external splines meshed with the large-diameter splines 13. This gives, as schematically shown in FIG. 5, the flow rate Q2 of the lubricating oil supplied into the first cell 24 a tendency to be lower than the flow rate Q1 of the lubricating oil supplied into the second cell 25. In order to make the flow rate Q2 of the lubricating oil supplied into the first cell 24 close to the flow rate Q1 of the lubricating oil supplied into the second cell 25 against the above tendency, it is necessary to make the pressure P2 in the first cell 24 be higher than the pressure P1 in the second cell 25.

In the embodiment, for example, making the first lubrication holes 21 provided to the first side wall 19a closer to the shifter 10 than the second side wall 19b and the second lubrication holes 22 provided to the second side wall 19b further from the shifter 10 than the first side wall 19a be different from each other in size enables the pressure P2 in the first cell 24 to be higher than the pressure P1 in the second cell 25. Specifically, respective inner diameters of the second lubrication holes 22 in communication with the second cell 25 are set to be smaller than respective inner diameters of the first lubrication holes 21 in communication with the first cell 24. Thus making the pressure of the lubricating oil in the shifter-side cell 24 be higher than the pressure of the lubricating oil in the non-shifter-side cell 25 allows lubricating oil to be sufficiently supplied not only to the non-shifter-side bearing 15 but also to the shifter-side bearing 14, the small-diameter splines 12, and the large-diameter splines 13.

If the outer peripheral surface of the dividing wall 19 and the inner peripheral surface of the low-speed large geared-wheel 7 are not being in close contact with each other but leaving a radial clearance 28 shown in FIG. 2 to exist between the outer peripheral surface and the inner peripheral surface, the difference between the pressure in the non-shifter-side cell 25 and the pressure in the shifter-side cell 24 may cause a flow of lubricating oil from the shifter-side cell 24 into the non-shifter-side cell 25 through the clearance 28, even though the dividing wall 19 on the low-speed side divides the cell 23 into the non-shifter-side cell 25 and the shifter-side cell 24. In other words, the difference in shape (difference in inner diameter or length) between the first and second lubrication holes 21 and 22 generates the pressure difference to allow lubricating oil to be supplied to the shifter-side bearing 14, the small-diameter splines 12, and the large-diameter splines 13, but the clearance 28 allows the lubricating oil to make movement through the clearance 28 due to the pressure difference; the movement can reduce amount of lubricating oil supplied to the shifter-side bearing 14, the small-diameter splines 12, and the large-diameter splines 13. The same holds true for the case of existence of clearances between inner peripheral surfaces of the first and second side walls 19a and 19b and the outer peripheral surface of the output shaft 5.

Hence, in the embodiment, it is preferable to make the clearance 28 between the outer peripheral surface of the peripheral wall 19c of the dividing wall 19 and the inner peripheral surface of the low-speed large geared-wheel 7 be small to thereby block or suppress the flow of the lubricating oil from the first cell 24 into the second cell 25 through the clearance 28. Specifically, it is preferable to apply a coating with lubricity (e.g., copper plating) to at least one of: respective inner peripheral surfaces of the first and second side walls 19a and 19b of the dividing wall 19 or the outer peripheral surface of the portion of the output shaft 5 between the paired left and right bearings 14 and 15 (clearance seal portion); and the outer peripheral surface of the peripheral wall 19c of the dividing wall 19 or the inner peripheral surface of the portion of each of the output-side large geared-wheels 7 and 8 between the first and second bearings 14 and 15 (clearance seal portion). In summary, in the case where the dividing wall 19 and the output shaft 5 have respective contact surfaces capable of rotating relatively to each other in contact with each other, i.e., respective contact surfaces each forming the clearance seal portion, it is preferable to apply the coating with lubricity to at least one of the contact surfaces. Also in the case where the dividing wall 19 and each of the output-side large geared-wheels 7 and 8 have respective contact surfaces capable of rotating relatively to each other in contact with each other, i.e., respective contact surfaces forming the clearance seal portion, it is preferable to apply the coating with lubricity to at least one of the contact surfaces. The coating with lubricity makes it possible to minimize damage in respective members of the dividing wall 19, the output shaft 5, and each of the output-side large geared-wheels 7 and 8, due to self-lubricity of copper or the like forming the coating, in spite of the contact between the first and second side walls 19a and 19b of the dividing wall 19 and the output shaft 5 and the contact between the peripheral wall 19c of the dividing wall 19 and each of the large geared-wheels 7 and 8 in the clearance seal portions.

Also in the dividing wall 19 provided for the output-side high-speed large geared-wheel 8, for example, the smaller hole diameters of the non-shifter-side second lubrication holes 22 than the hole diameters of the shifter-side first lubrication holes 21 makes it possible to obtain such effects as described above.

As described above, the two-speed-switchable reduction gear 1 allows lubricating oil to be sufficiently supplied not only to the first and second bearings 14 and 15 but also to the small-diameter splines 12 and the large-diameter splines 13 to thereby prevent a lubrication failure in each of the first bearings 14 which are shifter-side bearings especially close to the shifter 10, by giving mutual independence to the pressures of respective lubricating oils supplied to the first bearings 14 and the second bearings 15 aligned axially of the output shaft 5, and suppressing the movement of the lubricating oil due to the pressure difference between each of the second cells 25 which are the non-shifter-side cells and each of the first cells 24 which are the shifter-side cells to thereby make the pressure high in the first cell 24 adjacent to the first bearing 14, in spite that the first cell 24 was hard to supply with sufficient lubricating oil in the prior-art structure. Respective flow passage areas of the first and second lubrication holes 21 and 22 are preferably smaller than respective flow passage areas of the central lubricating oil flow path 16 and the radial flow paths 17. This generates fluid throttling effects, which prevents lubricating oil from flowing exclusively into one place to thereby allow lubricating oil to be supplied evenly to the paired left and right bearings 14 and 15, the small-diameter splines 12, and the large-diameter splines 13.

The flow path for the lubricating oil formed in the output shaft 5, having a shape where the plurality of radial flow paths 17 are communicated with the common central lubricating oil flow path 16 and branch off radially outward from the central lubricating oil flow path 16, allows a lot of lubricating oil to be supplied to the paired bearings 14 and 15, the small-diameter splines 12, and the large-diameter splines 13 by utilization of centrifugal force acting on the lubricating oil due to the rotation of the output shaft 5.

Figure 6:
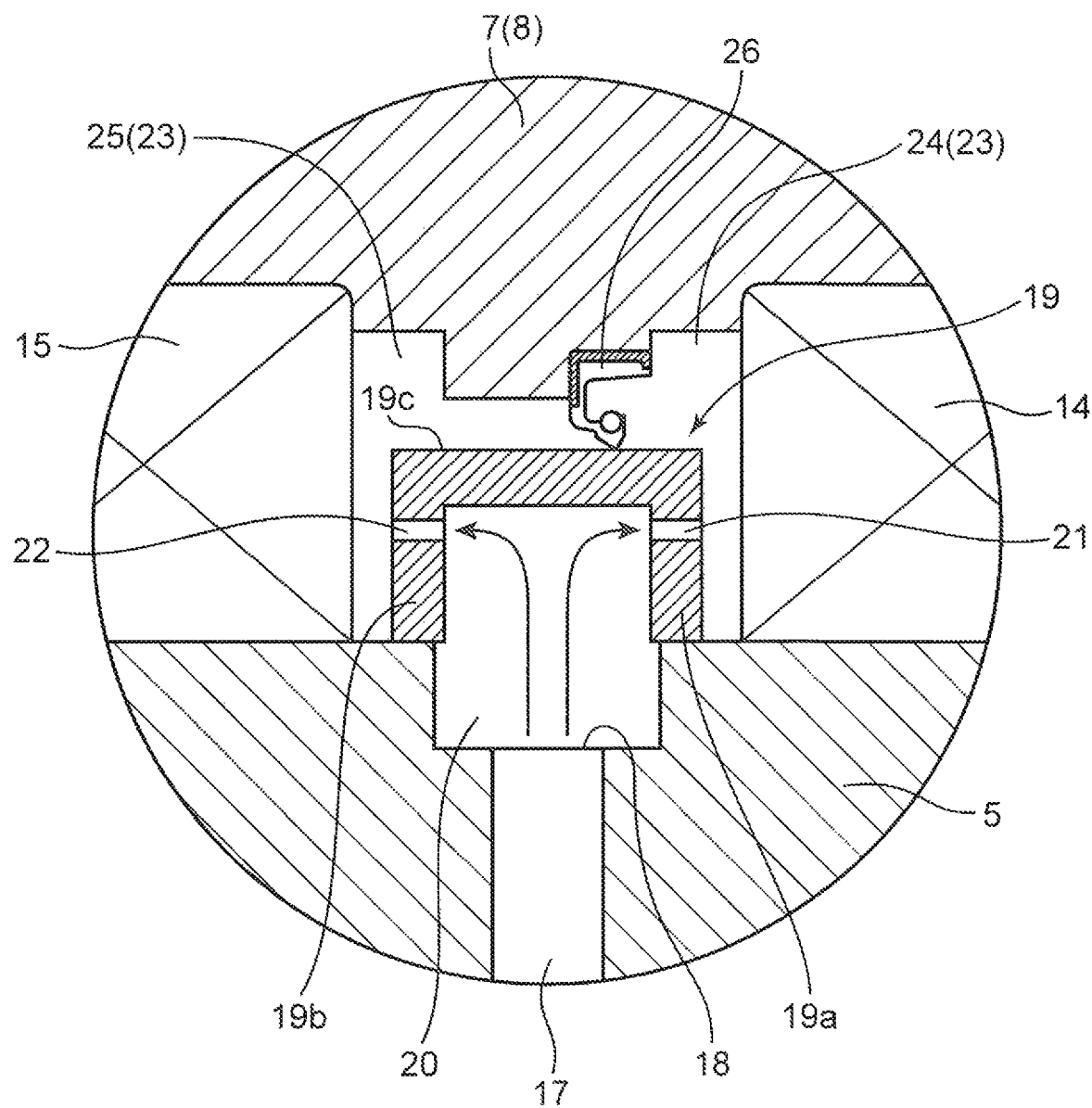
FIG. 6 is an enlarged sectional front view corresponding to FIG. 2 to show a relevant part of a speed-switchable reduction gear according to a modification.

Next will be described a two-speed-switchable reduction gear 1 according to a modification, with reference to FIG. 6.

The two-speed-switchable reduction gear 1 according to the modification is different from the two-speed-switchable reduction gear 1 according to the above-described embodiment and shown in FIGS. 1 and 2 only in the following points (a) and (b).

(a) Although there exist respective clearances 28 between outer peripheral surfaces of peripheral walls 19c of dividing walls 19 and inner peripheral surfaces of output-side large geared-wheels 7 and 8 also in the two-speed-switchable reduction gear 1 according to the modification, the above clearances 28 are larger than the clearances 28 in the two-speed-switchable reduction gear 1 according to the above-described embodiment. In addition, the two-speed-switchable reduction gear 1 according to the modification further includes an oil seal 26 provided to each of the clearances 28.

(b) In the two-speed-switchable reduction gear 1 according to the modification, the outlet 18 of each of a plurality of radial flow paths 17 is at a position closer to the axis than the outer peripheral surface of an output shaft 5. Specifically, the outer peripheral surface of the output shaft 5 includes a specific portion located between a pair of bearings 14 and 15, the specific portion being a small-diameter outer peripheral surface 5 recessed radially inward beyond the other portion to thereby form a step (i.e., having a small diameter); the outlet 18 is located in the small-diameter outer peripheral surface 5.

The other structures of the two-speed-switchable reduction gear 1 according to the modification than the above-described differences (a) and (b) are the same as that of the two-speed-switchable reduction gear 1 according to the above-described embodiment; hence, descriptions thereabout will be omitted.

Each of the oil seals 26 is a member forming a seal structure which restrains lubricating oil from being flowed out from a first cell 24 into a second cell 25 through the clearance 28, being provided at a position close to the shifter-side cell 24 in the clearance 28 between the outer peripheral surface of the peripheral wall 19c of the dividing wall 19 and the inner peripheral surface of each of the output-side large geared-wheels 7 and 8. The oil seal 26, which is made of elastic material such as hard rubber, includes a base portion 26a which extends radially outward from an inner peripheral surface of the output-side large geared-wheel 7 or 8 and a seal portion 26b inclined toward the bearing 14 as it extends radially inward from the base portion 26a, the seal portion 26b having a tip end portion capable of making close contact with the outer peripheral surface of the peripheral wall 19c.

Provided in the clearance 28, the oil seal 26 blocks or suppresses movement of lubricating oil through the clearance 28 between the outer peripheral surface of the dividing wall 19 and the large geared-wheel 7 or 8, the movement caused by a pressure difference of lubricating oil due to the difference in shapes between first and second lubrication holes 21 and 22 provided to a first side wall 19a close to the shifter 10 and a second side wall 19b on an opposite side to the shifter 10, respectively; the oil seal 26 thereby enables larger amount of lubricating oil to be supplied to the bearing 14 close to the shifter 10, the small-diameter splines 12, and the large-diameter splines 13. The shape and material of the oil seal 26 may be suitably selected under the condition that the oil seal 26 reliably separates, in the clearance 28, a part in communication with the second cell 25 and a part in communication with the first cell 24 from each other to thereby suppress the movement of lubricating oil between the second and first cells 25 and 24.

The step in the outer peripheral surface of the output shaft 5 between each of the small-diameter outer peripheral surfaces 5a enclosing the outlets 18 and the other parts enlarges an outer peripheral flow path 20 formed on an inner side of the dividing wall 19 to thereby enable larger amount of lubricating oil to be flowed.

The embodiments disclosed this time are merely examples in every respect and should not be considered restrictive. Especially, in the embodiments disclosed this time, for what are not explicitly disclosed, e.g., operating and working conditions, various parameters, dimensions, weights, and volumes of components, and the like, values which the ordinary person skilled in the art can easily think of are employed.

The technique according to the invention is widely applicable to a speed-switchable reduction gear (e.g., two-speed or three-speed-switchable reduction gear) including a plurality of output-side geared-wheels and a shifter for selecting the output-side geared-wheel, to be used to reduce a rotational driving force in speed to a predetermined speed, from the plurality of output-side geared-wheels.

As described above, provided is a speed-switchable reduction gear allowing lubricating oil to be appropriately supplied to bearings supporting output-side geared-wheels. The speed-switchable reduction gear includes: an input shaft; an output shaft which outputs a rotational driving force transmitted from the input shaft, to an outside; a plurality of output-side geared-wheels which are mounted on the output shaft correspondingly to respective reduction ratios so as to be capable of transmitting the rotational driving force from the input shaft to the output shaft and switching the reduction ratio that is a ratio of a rotating speed of the input shaft to a rotating speed of the output shaft; a shifter which selectively connects one of the plurality of output-side geared-wheels to the output shaft to allow the rotational driving force to be transmitted from the output shaft gear to the output shaft; a first bearing and a second bearing which are provided to each of the plurality of output-side geared-wheels, the first bearing and the second bearing being disposed on an outer peripheral surface of the output shaft and spaced axially of the output shaft so as to form, between the first bearing and the second bearing, a cell for supplying lubricating oil to the first bearing and the second bearing, the first bearing and the second bearing supporting each of the output-side geared-wheels so as to allow the output-side geared-wheel to be rotated relatively to the output shaft; and a plurality of dividing walls each provided in each of the cells on an inner side of each of the plurality of output-side geared-wheels so as to protrude radially outward from the outer peripheral surface of the output shaft. Each of the first bearings is a shifter-side bearing provided at a position where the first bearing allows the lubricating oil to be supplied to the shifter through the first bearing, the position being closer to the shifter than the dividing wall, and each of the second bearings is a non-shifter-side bearing positioned on opposite side of the dividing walls to the first bearing. The output shaft includes an axial lubricating-oil flow path, which extends along axially of the output shaft in the output shaft to allow the lubricating oil to flow in the axial lubricating-oil flow path, and a plurality of supply flow paths which extend radially outward from the axial lubricating-oil flow path to make communication with the cells. Each of the dividing walls divides each of the cells into a first cell adjacent to each of the first bearings and a second cell adjacent to each of the second bearings and allows the lubricating oil to be supplied from the supply flow paths into each of the first cells and to be supplied from the supply flow paths into each of the second cells so as to make pressure of the lubricating oil in each of the first cells be higher than pressure of the lubricating oil in each of the second cells.

According to this reduction gear, each of the dividing walls, dividing each of the compartments, each of which is formed between the paired bearings supporting each of the output-side gears for rotation, into the first compartment and the second compartment, enables lubricating oil to be appropriately supplied to both of the paired bearings.

Preferably, the dividing walls are disposed so as to be rotatable relatively to one of the output shaft gears and the output shaft, and the speed-switchable reduction gear further includes seal structures each of which is disposed in each of the clearances to suppress the flow of the lubricating oil between each of the first cells and each of the second cells through the clearance. Each of the seal structures further improves independence of the pressure in each of the first cells and the pressure in each of the second cells of each other to thereby enable further appropriate supply of the lubricating oil.

Specifically, it is preferable that each of the dividing walls includes a first side wall defining each of the first cells between the first side wall and each of the first bearings and a second side wall defining each of the second cells between the second side wall and each of the second bearings, the first side wall being provided with a first lubrication hole allowing lubricating oil to be supplied from the supply flow paths into each of the first cells through the first lubrication hole, the second side wall being provided with a second lubrication hole allowing lubricating oil to be supplied from the supply flow paths into each of the second cells through the second lubrication hole, the first lubrication holes and the second lubrication holes having respective shapes which are set so as to make the flow resistance to the lubricating oil in the second lubrication holes be larger than the flow resistance to the flow of the lubricating oil in the first lubrication holes. This structure reliably provides a difference between the pressure in each of the first cells and the pressure in each of the second cells.

In the case where each of the dividing walls and the output shaft have respective contact surfaces which rotate relatively to each other in contact with each other, it is preferable that at least one of the contact surfaces is applied with coating with lubricity. On the other hand, in the case where each of the dividing walls and each of the output-side geared-wheels have respective contact surfaces which rotate relatively to each other in contact with each other, it is preferable that at least one of the contact surfaces is applied with coating with lubricity. In each of the above-described cases, the lubricity of the coating effectively restrains the contact surfaces from abrasion damage due to the contact of the contact surfaces.

Preferably, the first lubrication holes and the second lubrication holes are provided at a plurality of positions aligned peripherally of the output shaft, respectively. This enables lubricating oil to be supplied to the first and second bearings with high circumferential evenness.

Preferably, each of the lubrication holes has a smaller flow passage areas than respective flow passage areas of the axial lubricating-oil flow path and the respective supply flow paths. The throttling effects by the lubrication holes with the small flow passage areas suppress unevenness in the flow of the lubricating oil to thereby enable lubricating oil to be supplied to the bearings and the shifter with high evenness.

Furthermore, the flow passage area of each of the second lubrication holes is preferably smaller than the flow passage area of each of the first lubrication holes. This allows the pressure of lubricating oil in the first cells to be reliably higher than the pressure of lubricating oil in the first cells.

The plurality of supply flow paths are preferably disposed so as to branch off radially outward from the axial lubricating-oil flow path to supply the lubricating oil into the cells. This makes it possible to apply the centrifugal force generated by the rotation of the output shaft on the lubricating oil to thereby facilitate the supply of the lubricating oil to the bearings and the shifter.

The invention claimed is:
1. A speed-switchable reduction gear comprising:
an input shaft;
an output shaft which outputs a rotational driving force transmitted from the input shaft, to an outside;
a plurality of output-side geared-wheels which are mounted on the output shaft correspondingly to respective reduction ratios, each of the reduction ratios being a ratio of a rotating speed of the input shaft to a rotating speed of the output shaft, so as to be capable of transmitting the rotational driving force from the input shaft to the output shaft and switching the reduction ratios;
a shifter which selectively connects one of the plurality of output-side geared-wheels to the output shaft to allow the rotational driving force to be transmitted from the output-side geared-wheels to the output shaft;
a plurality of bearing pairs which are provided to each of the plurality of output-side geared-wheels, respectively, the bearing pairs including respective first bearings and respective second bearings and formed with respective cells, the first bearing and the second bearing in each of the bearing pairs being disposed on an outer peripheral surface of the output shaft and spaced in an axial direction of the output shaft so as to form the cell between the first bearing and the second bearing for supplying lubricating oil to the first bearing and the second bearing, the first bearings and the second bearings supporting the output-side geared-wheels, respectively, so as to allow the output-side geared-wheels to be rotated relatively to the output shaft; and
a plurality of dividing walls each provided in each of the cells on an inner side of each of the plurality of output-side geared-wheels so as to protrude radially outward from the outer peripheral surface of the output shaft, wherein:
each of the first bearings is a shifter-side bearing provided at a position where each of the first bearings allows the lubricating oil to be supplied to the shifter through each of the first bearings, the position being closer to the shifter than each of the dividing walls, and each of the second bearings is a non-shifter-side bearing positioned on opposite side of each of the dividing walls to each of the first bearings;
the output shaft includes an axial lubricating-oil flow path, which extends along axially of the output shaft in the output shaft to allow the lubricating oil to flow in the axial lubricating-oil flow path, and a plurality of supply flow paths which extend radially outward from the axial lubricating-oil flow path to make communication with the cells; and
the dividing walls divide the cells into a plurality of first cell portions adjacent to the first bearings and a plurality of second cell portions adjacent to the second bearings, respectively, and allows the lubricating oil to be supplied from the supply flow paths into the first cell portions and to be supplied from the supply flow paths into the second cell portions so as to make pressure of the lubricating oil in the first cell portions be higher than pressure of the lubricating oil in the second cell portions.

2. The speed-switchable reduction gear according to claim 1, wherein the dividing walls are disposed so as to be rotatable relatively to one of the output-side geared-wheels and the output shaft, the speed-switchable reduction gear further comprising seal structures each of which is disposed in a clearance between each of the first cell portions and each of the second cell portions to suppress the flow of the lubricating oil through the clearance.

3. The speed-switchable reduction gear according to claim 1, wherein each of the dividing walls includes a first side wall defining each of the first cell portions between the first side wall and each of the first bearings and a second side wall defining each of the second cell portions between the second side wall and each of the second bearings, the first side wall being provided with at least one first lubrication hole allowing lubricating oil to be supplied from the supply flow paths into each of the first cell portions through the first lubrication hole, the second side wall being provided with at least one second lubrication hole allowing lubricating oil to be supplied from the supply flow paths into each of the second cell portions through the second lubrication hole, the first lubrication hole and the second lubrication hole having respective shapes which are set so as to make flow resistance to the lubricating oil in the second lubrication hole be larger than flow resistance to the lubricating oil in the first lubrication hole.

4. The speed-switchable reduction gear according to claim 3, wherein the at least one first lubrication hole includes a plurality of first lubrication holes which are provided at respective positions aligned peripherally of the output shaft and the at least one second lubrication hole includes a plurality of second lubrication holes which are provided at respective positions aligned peripherally of the output shaft.

5. The speed-switchable reduction gear according to claim 3, wherein the first lubrication hole and the second lubrication hole has a smaller flow passage area than respective flow passage areas of the axial lubricating-oil flow path and the plurality of supply flow paths.

6. The speed-switchable reduction gear according to claim 3, wherein the flow passage area of the second lubrication hole is smaller than the flow passage area of the first lubrication hole.

7. The speed-switchable reduction gear according to claim 1, wherein each of the dividing walls and the output shaft have respective contact surfaces which rotate relatively to each other in contact with each other, and at least one of the contact surfaces is applied with coating with lubricity.

8. The speed-switchable reduction gear according to claim 1, wherein each of the dividing walls and each of the output-side geared-wheels have respective contact surfaces which rotate relatively to each other in contact with each other, and at least one of the contact surfaces is applied with coating with lubricity.

9. The speed-switchable reduction gear according to claim 1, wherein the plurality of supply flow paths are disposed so as to branch off radially outward from the axial lubricating-oil flow path to supply the lubricating oil into the cells.

* * * * *